United States Patent [19]

Moxham

[11] Patent Number: 4,588,215
[45] Date of Patent: May 13, 1986

[54] JOINING TUBULAR MEMBERS

[76] Inventor: John Moxham, 104 Harkwood Drive, Hamworthy, Poole, Dorset, England, BH15 4PF

[21] Appl. No.: 420,086

[22] Filed: Sep. 20, 1982

[30] Foreign Application Priority Data

Sep. 23, 1981 [GB] United Kingdom ............... 8128753

[51] Int. Cl.[4] ............................................. F16L 13/14
[52] U.S. Cl. ................................. 285/382.2; 285/94; 285/915
[58] Field of Search ................ 285/382, 382.2, 382.4, 285/382.5, 381; 29/525

[56] References Cited

U.S. PATENT DOCUMENTS

| 3,972,548 | 8/1976 | Roseen | 285/381 |
| 4,061,367 | 12/1977 | Moebius | 285/382.2 |
| 4,379,575 | 4/1983 | Martin | 285/381 X |

FOREIGN PATENT DOCUMENTS

| 253701 | 7/1927 | Italy | 285/284 |
| 259891 | 10/1926 | United Kingdom | 285/381 |
| 773033 | 4/1957 | United Kingdom . | |
| 1022929 | 3/1966 | United Kingdom . | |
| 1244948 | 9/1971 | United Kingdom . | |
| 1399047 | 6/1975 | United Kingdom | 285/382.2 |

Primary Examiner—Dave W. Arola
Attorney, Agent, or Firm—Pennie & Edmonds

[57] ABSTRACT

A method of joining two tubular members which comprises inserting an end portion, which forms a spigot, of one of them into an end portion, which forms a socket, of the other to achieve an interference fit. The thickness of the wall of the end portion of at least one of the tubular members so varies in an axial direction that, when the spigot has been fully inserted into the socket, the external diameter of the spigot and the internal diameter of the socket are smaller at a first point on the axis than at a second point on the axis, the first point being nearer to the mouth of the socket than the second point.

19 Claims, 8 Drawing Figures

JOINING TUBULAR MEMBERS

BACKGROUND OF THE INVENTION

The invention relates to joining tubular members.

It has previously been proposed to join two pipes together by enlarging the end portion of one of the pipes into a socket and pushing the end portion of the other pipe, which forms a spigot, into the socket, the socket having an internal diameter slightly less than the external diameter of the spigot, so that an interference fit is achieved between the spigot and socket.

It has also been proposed to join two pipes together using a sleeve having an internal diameter slightly less than the external diameter of the pipes. The end portion of one pipe is pushed into one end of the sleeve and the end portion of the other pipe is pushed into the other end of the sleeve in the opposite direction so that interference fits are achieved.

SUMMARY OF THE INVENTION

The invention provides a method of joining two tubular members which comprises inserting an end portion, which forms a spigot, of one of the tubular members into an end portion, which forms a socket, of the other to achieve an interference fit, the thickness of the wall of the end portion of at least one of the tubular members so varying in an axial direction that, when the spigot has been fully inserted into the socket, the external diameter of the spigot and the internal diameter of the socket are smaller at a first point on the axis than at a second point on the axis, the first point being nearer to the mouth of the socket than the second point.

The invention also provides two tubular members joined together by means of an end portion, which forms a spigot, of one of the tubular members being in interference fit with an end portion, which forms a socket, of the other of the tubular members, the thickness of the wall of the end portion of at least one of the tubular members so varying in an axial direction that the external diameter of the spigot and the internal diameter of the socket are smaller at a first point on the axis than at a second point on the axis, the first point being nearer to the mouth of the socket than the second point.

In order to achieve an interference fit, the internal diameter of the socket should generally be less than the external diameter of the spigot along the length to be joined. When the spigot is inserted into the socket, both the spigot and the socket are deformed, the internal diameter of the socket being increased and the external diameter of the spigot being decreased. Assuming that the deformation in each case remains within the elastic limit or limits of the material or materials of which the tubular members are composed, then an interference fit is achieved. In the methods of forming interference fit joints previously proposed, where the wall thickness of the spigot and socket are substantially uniform along their length, then the deformation of the spigot along its length is substantially uniform, as is the deformation of the socket. If the internal and external diameters of the spigot and socket are substantially uniform before insertion then they remain substantially uniform after insertion.

It has been found, however, that, by arranging for the thickness of the wall of the end portion of at least one of the tubular members, and, advantageously, the socket, to vary in an axial direction it is possible to vary the extent of deformation caused along the length of the spigot and socket. By suitably varying the wall thickness of the socket, it has been found possible to arrange that the deformation experienced by a portion of the spigot as it is inserted is greater at a position nearer to the mouth of the socket than at a position further along the socket, where it is allowed to expand back towards its original diameter. Thus, it has been found possible to achieve the situation that, while still maintaining an interference fit along the length of the spigot and socket, when the spigot has been fully inserted into the socket, the external diameter of the spigot and the internal diameter of the socket are greater at the second point on the axis than at the first point.

Accordingly, it has been found possible using the method of the invention, to provide an interference fit joint having increased resistance to separation as compared with inteference fit joints as previously proposed. Furthermore, it is possible not only to reduce the maximum axial load required to make the joint but also to reduce the rate of increase in axial load required as the spigot is inserted into the socket.

Although the advantages of the invention can be achieved by varying the wall thickness of the spigot, manufacturing considerations mean that it is generally preferable for the variation in wall thickness to be provided in the socket rather than the spigot. When the variation in wall thickness is provided by a variation in the thickness of the wall of the socket, as is advantageous, then the mean wall thickness of a first portion of the socket, that is to say, the thickness of the wall averaged over the length of that portion, is greater than that of a second portion further from the mouth of the socket than the first portion.

The variation in thickness of the wall of the socket may be a continuous decrease in wall thickness in an axial direction away from the mouth of the socket. Alternatively, the variation in thickness of the wall of the socket may be provided by having one or more annular grooves, preferably, a plurality of such annular grooves separated from one another in an axial direction. These grooves may be of different lengths in an axial direction, be separated from each other by different distances, and/or provide a wall thickness which differs from one groove to another.

The part of the internal surface of the socket that is to be in interference fit with the spigot when the spigot is fully inserted into the socket is advantageously substantially cylindrical, preferably, cylindrical to within manufacturing tolerances, before insertion of the spigot. The part of the external surface of the spigot that is to be in interference fit with the socket when it has been fully inserted into the socket is also advantageously substantially cylindrical, preferably, cylindrical to within manufacturing tolerances, before insertion.

If the variation in wall thickness of the socket is a continuous one, the external surface of the socket may, at least before the spigot is inserted into it, meet a plane containing the axis of the socket at a straight line or a curve, the centre of curvature of which may be situated on either side of the external surface.

The maximum thickness of the wall of the socket is advantageously substantially equal to the maximum thickness of the wall of the spigot to within manufacturing tolerances.

The wall thickness of the socket may decrease by up to approximately one half of its maximum thickness or more, but preferably does not decrease by substantially more than one half of its maximum thickness.

Even if the variation in wall thickness is such that the amount of which the deformation is reduced as the spigot travels along the socket allows a portion of the spigot to return back towards its original diameter by only 5% of its maximum change in diameter a significant advantage can still be achieved with the method of the invention. It is possible, however, to arrange for a portion of the spigot to return back towards its original diameter by up to 95% of its maximum change in diameter.

The length of penetration of the spigot into the socket preferably lies within the range of one half to two and one half times the external diameter of the tubular member having the spigot.

The tubular members may be composed of steel, or an alloy of steel or copper, or they may be composed of any other material having suitable elastic qualities.

The tubular member having the socket may be in the form of a sleeve, the other end portion of which forms a second socket for receiving a second spigot of a further tubular member and forming a join preferably in accordance with the invention. In such a case, the variation in wall thickness is advantageously provided by variation in the thickness of the wall of the sleeve.

Advantageously, the external surface of the spigot and/or the internal surface of the socket is coated with a curable lubricant prior to insertion of the spigot into the socket, and, after insertion, the curable lubricant is caused or allowed to cure. The use of such a lubricant, for example, a two part epoxy resin, can facilitate insertion of the spigot by reducing the load required, evening out any imperfections or irregularities on the surfaces to be joined, and decreasing the possibility of "scuffing", that is to say, "pick up" and/or scoring of the surfaces of the tubular members during insertion.

Advantageously, the end wall of the mouth of the socket is chamfered to facilitate initial insertion of the spigot. The internal surface of the socket is also preferably grooved in order to increase the contact pressure, and to trap the lubricant, when provided.

The method of the invention can be used to join pipes intended to carry any fluid, especially oil, natural gas, or water, or conduits for carrying cables, and of a diameter within the range of from ¼" to 48".

DESCRIPTION OF THE PREFERRED EMBODIMENTS

Figure 1:
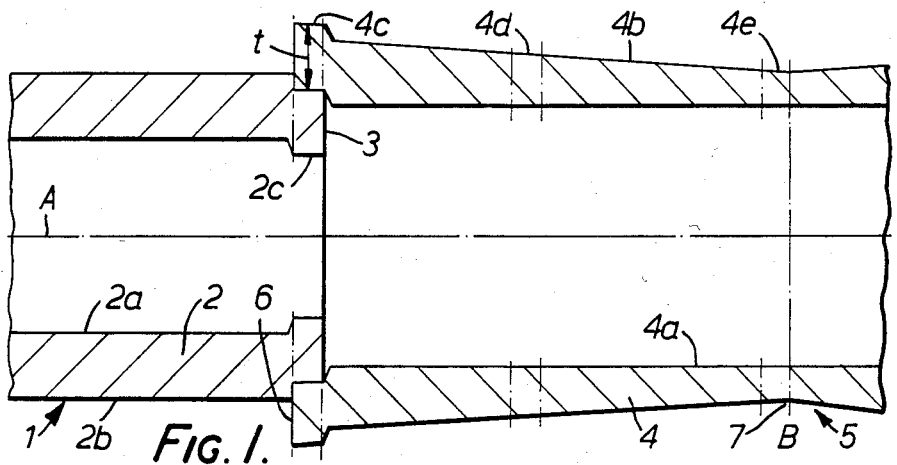
FIG. 1 shows diagrammatically the initial insertion of one tubular member into another into the first form of the invention.

Referring to the accompanying drawings, and initially to the first form of the invention and to FIG. 1, an end portion of a tubular member indicated generally by the reference numeral 1, forms a spigot 2 having a leading end 3. The spigot 2 has generally cylindrical inner and outer surfaces 2a and 2b, respectively, that is to say, generally uniform internal and external diameters along its length, and generally uniform wall thickness along its length, before insertion into an end portion, which forms a socket 4, of a second tubular member, indicated generally by the reference numeral 5. Before insertion of the spigot 2 into the socket 4, the socket also has a generally cylindrical inner surface 4a, that is to say, a generally uniform internal diameter along its length. The thickness of the wall of the socket 4, which at its mouth 6 is equal to that of the spigot 2 (within manufacturing tolerances) continuously decreases in an axial direction (the axis being marked by a line A) away from the mouth 6 along the length of the socket to its inner end 7 marked by a line B, the mean wall thickness of a portion 4d of the socket (that is to say, the thickness of the wall averaged over the length of that portion) being equal to 0.75t, where t is the mean wall thickness of a portion 4c adjacent to the mouth 6 of the socket, and the mean wall thickness of a portion 4e of the socket adjacent to the inner end 7 of the socket being equal to 0.50t. External surface 4b of the socket 4 meets a plane containing the axis A at a straight line. The length of the socket 4 from its mouth 6 to its inner end 7 is approximately one and one half times the external diameter of the tubular member 1. The external diameter of the spigot 2 is greater than the internal diameter of the socket 4 before insertion by an amount, known as the interference amount, generally of from 0.005" to 0.600" depending on the diameters of the tubular members and the manufacturing tolerances, but the interference amount may be as small as 0.0005". The tubular members 1 and 5 are composed of steel.

On initial insertion of the leading end 3 of the spigot 2 into the socket 4, as shown in FIG. 1, both the wall of the socket and the wall of the spigot are deformed, the deformation being shown exaggerated in the Figures for clarity. Since the wall thicknesses of the spigot 2 and the socket 4 at its mouth 6 are substantially equal, the deformation of a portion 2c of the spigot adjacent to its leading end 3 and the portion 4c of the socket is also substantially equal, the internal diameter of the portion 4c of the socket being increased by an amount substantially equal to the decrease in the external diameter of the portion 2c of the spigot.

Figure 2:
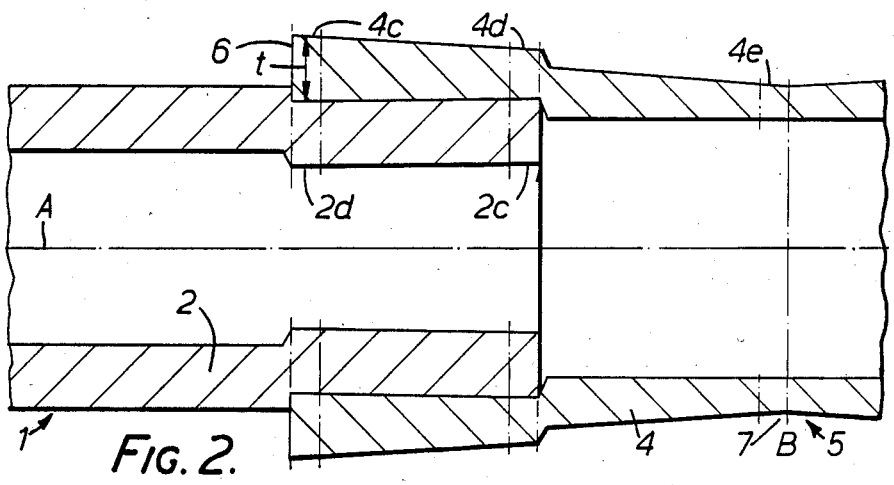
FIG. 2 shows diagrammatically the case in which one of the tubular members has been inserted into the other by a length equal to half the full penetration length in the first form of the invention.
Figure 3:
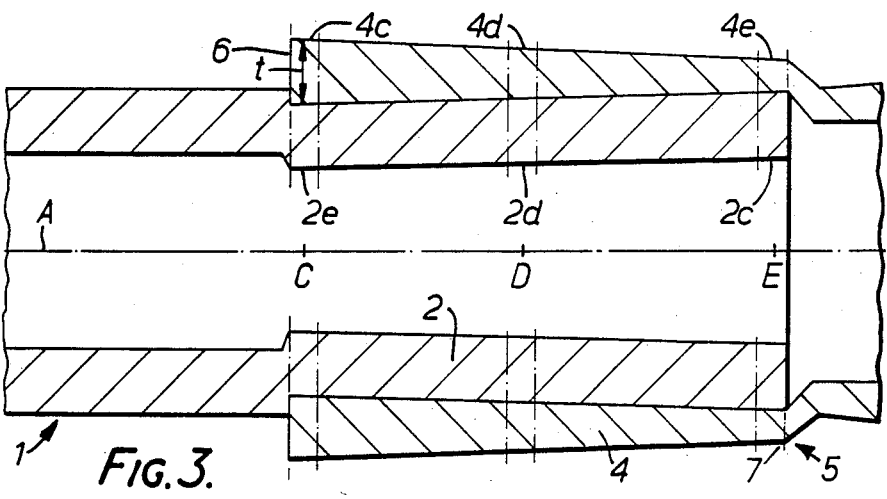
FIG. 3 shows diagrammatically the case in which one of the tubular members has been fully inserted into the other in the first form of the invention.

As the spigot 2 is inserted further into the socket 4, it meets a socket wall of decreasing thickness. When the leading end 3 of the spigot 2 reaches approximately half way along the socket 4, as seen in FIG. 2, the portion 2c of the spigot is in contact with the portion 4d of the socket, the mean wall thickness of which is equal to only 0.75t, that is to say, the mean wall thickness has decreased by approximately one quarter. Accordingly, the resistance of the portion 4d of the wall of the socket 4 to deformation by the spigot 2 is less than that of the portion 4c, and the deformation of the portion 4d is greater, its mean internal diameter being greater than that of the portion 4c which is still experiencing the same deformation as on initial insertion since the wall thickness of the spigot 2 is substantially constant. The portion 2c of the spigot 2, on the other hand, is allowed to return partially towards its initial dimensions, with a consequent increase in its external diameter, the mean external diameter of the portion 2c, that is to say, the external diameter averaged over the length of that portion, being greater than that of a portion 2d, which is in contact with the socket portion 4c. This increase in the external diameter of the spigot portion 2c continues until the spigot 2 is fully inserted into the socket 4 as shown in FIG. 3.

When the spigot 2 has been inserted to its fullest extent into the socket 4, the portion 2c of the spigot is in contact with the portion 4e of the socket which is of a mean wall thickness 0.50t of only half that of the portion 4c of the socket. Here, nearly all the deformation is taken up by the socket 4, and the external diameter of the spigot at the portion 2c is allowed to return almost to its external diameter before insertion. The portion 2d of the spigot 2 is now in contact with the portion 4d of the socket 4 so that its external diameter is also increased compared to that of a portion 2e of the spigot now in contact with the portion 4c of the socket. Accordingly, as can be seen from FIG. 3, when the spigot 2 has been fully inserted into the socket 4 and is in interference fit with the socket along its length, the external diameter of the spigot and the internal diameter of the socket are smaller at a first point C on the axis A than at a second point D or a third point E, and the spigot and socket have a so-called "reverse taper".

Because of the reverse taper, the resistance to separation of the interference fit joint is increased. In addition, because the spigot 2 meets a socket 4 of continuously decreasing wall thickness as it is inserted, the total axial load required to insert the spigot into the socket to make the interference fit joint, and the rate of increase in the axial load as the spigot is inserted into the socket, are reduced.

The outer surface 2b of the socket 2 and the inner surface 4a of the socket 4 are coated with a curable lubricant (not shown), for example, a two-part epoxy resin, before insertion. The lubricant, which serves to facilitate insertion by reducing the load required, evening out any imperfections or irregularities on the surfaces to be joined and decreasing the possibility of "scuffing", is allowed to cure after insertion.

Figure 4:
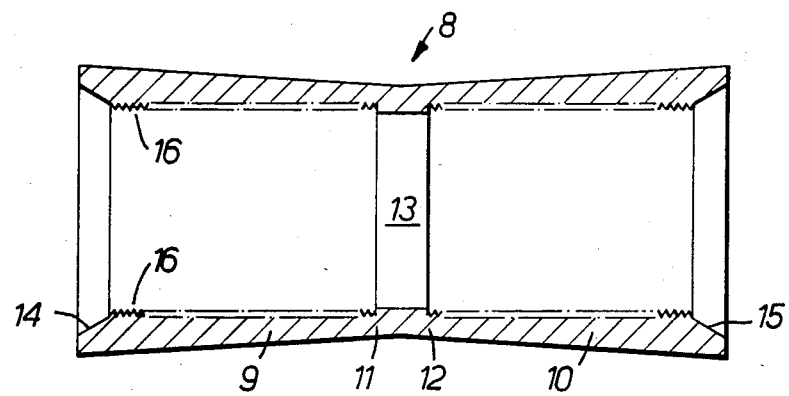
FIG. 4 shows diagrammatically a tubular member for forming a join in the second form of the invention.
Figure 5:
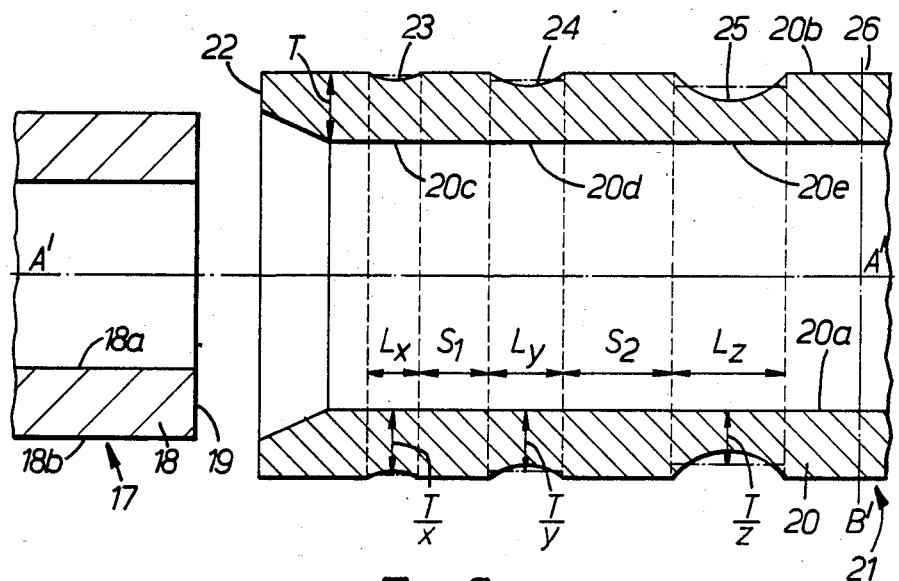
FIG. 5 shows diagrammatically two tubular members of the third form of the invention before insertion of one of them into the other.

Referring to FIG. 4, a tubular member 8 in the form of a sleeve has a socket portion 9 at one end and a second socket 10 at the other end separated at their inner ends 11 and 12, respectively, by a central register portion 13 of smaller internal diameter. This register portion 13 may, however, be dispensed with. The end walls 14 and 15, respectively, of the mouths of the sockets 9 and 10 are chamfered to facilitate initial insertion of a spigot, and internal surfaces of the sockets are formed with grooves 16 to increase contact pressure when spigots are inserted, and also to retain a curable lubricant (not shown) with which the internal surfaces of the sockets 9 and 10 and the external surfaces of the spigots are coated before insertion.

The internal surface of the sockets 9 and 10 are generally cylindrical, that is to say, the sockets have generally uniform internal diameters along their lengths. The thickness of the wall of each of the sockets 9 and 10 continuously decreases in an axial direction from its mouth to its inner end by approximately one half of its maximum thickness.

The sleeve 8 can be used to join together two pipes of external diameter approximately 0.0005" to 0.600" greater than the internal diameter of the sockets 9 and 10, one of the pipes providing a spigot for insertion into the socket 9, and the other pipe providing a spigot for insertion into the socket 10, in each case in a similar manner to that described with reference to FIGS. 1 to 3.

Referring now to the third form of the invention as shown in FIGS. 5 to 8, an end portion of a tubular member, indicated generally by the reference numeral 17, forms a spigot 18 having a leading end 19. The spigot 18 has generally cylindrical inner and outer surfaces 18a and 18b, respectively, and a generally uniform wall thickness along its length, before insertion into a socket 20 of a second tubular member, indicated generally by the reference numeral 21. Before insertion of the spigot 18 into the socket 20, the socket also has a generally cylindrical inner surface 20a. The thickness T of the wall of the socket 20 adjacent to its mouth 22, the wall of which is chamfered to facilitate initial insertion of the spigot 18, is equal to that of the spigot 18 (within manufacturing tolerances). On its external surface 20b, the socket 20 is formed with a plurality of annular grooves 23, 24 and 25, respectively. The groove 23 of a length $L_x$ in an axial direction (the axis being marked by a line A') extends over a portion 20c of the socket 20 which portion has a resulting mean wall thickness, that is to say, the thickness of the wall averaged over the length $L_x$, of $T/x$ where x is a number greater than 1. The groove 24 of a length $L_y$ ($L_y$ being greater than $L_x$) is separated from the groove 23 by a distance $S_1$, and extends over a portion 20d of the socket 20 which has a resulting mean wall thickness of $T/y$ where $y>x>1$. The groove 25 of a length $L_z$ ($L_z$ being greater than $L_y$) is separated from the groove 24 by a distance $S_2$ greater than $S_1$ and extends over a portion 20e of the socket 20 which has a resulting mean wall thickness of $T/z$ where $z>y>x>1$.

The length of the socket 20 from its mouth 22 to its inner end 26 marked by the line B' is approximately one and one half times the external diameter of the tubular member 17. The external diameter of the spigot 18 is greater than the internal diameter of the socket 20 by an amount of from 0.005" to 0.600" depending on the diameters of the tubular members and the manufacturing tolerances. The tubular members 17 and 21 are made of steel.

Figure 6:
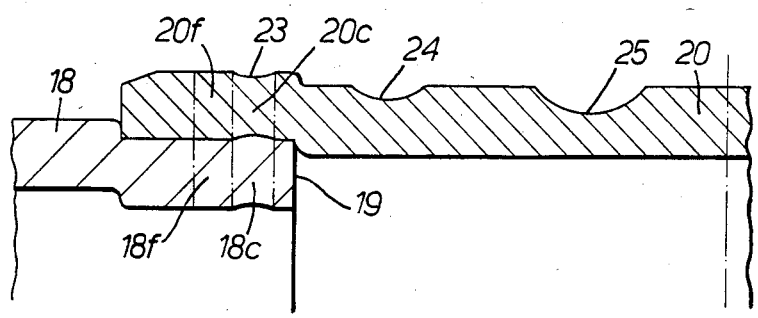
FIG. 6 shows diagrammatically the initial insertion of one of the two tubular members into the other in the third form of the invention.

On insertion of the leading end 19 of the spigot 18 into the socket 20, at a first stage as shown in FIG. 6, both the wall of the socket and the wall of the spigot are deformed, the deformation being shown exaggerated in the Figure for clarity. At the portion 20c of the socket, however, which is in contact with a portion 18c of the spigot, because the mean wall thickness of the portion 20c is less than that of the socket in an adjacent portion 20f nearer to the mouth of the socket, the deformation experienced by the portion 18c of the spigot is less than that experienced by a portion 18f in contact with the socket portion 20f. Consequently, the portion 18c of the spigot is allowed to return slightly towards its original dimensions before insertion, so that the mean external diameter of the portion 18c of the spigot, that is to say, the external diameter averaged over the length of the portion 18c, and the mean internal diameter of the portion 20c of the socket, that is to say, the internal diameter averaged over the length of the portion 20c, are greater than that of the portion 18f of the spigot and portion 20f of the socket.

Figure 7:
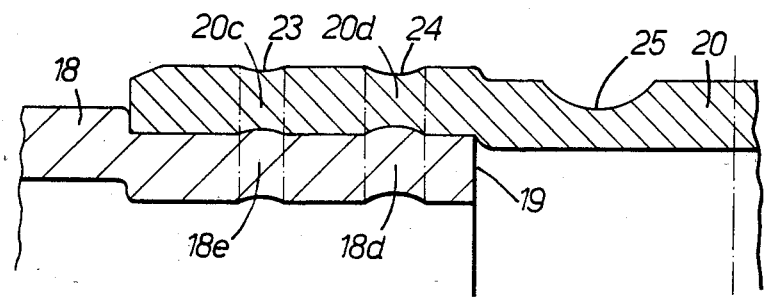
FIG. 7 shows diagrammatically an intermediate stage in the insertion of one of the tubular members into the other in the third form of the invention.

A second stage of insertion is shown in FIG. 7, in which a portion 18d of the spigot is now in contact with the portion 20d of the socket, while a portion 18e of the spigot is in contact with the portion 20c of the socket. The portions 18d and 18e are allowed to return towards their original dimensions, the portion 18d being allowed to return by a greater amount than the portion 18e since the mean wall thickness T/y of the portion 20d is less than that of the portion 20c and its length $L_y$ is greater than that of the portion 20c.

Figure 8:
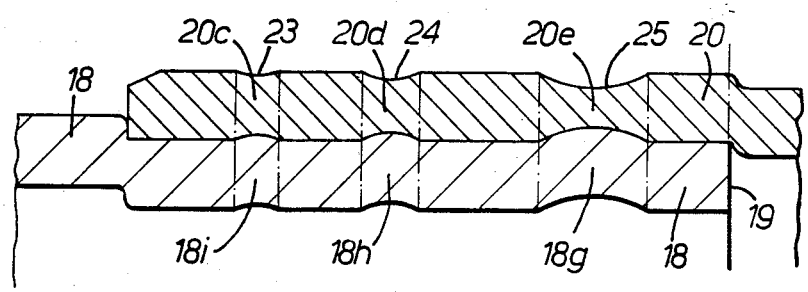
FIG. 8 shows diagrammatically one of the tubular members fully inserted into the other in the third form of the invention.

A third and final stage of insertion is shown in FIG. 8, in which a portion 18g of the spigot 18 is now in contact with the portion 20e of the socket, a portion 18h of the spigot is in contact with the portion 20d of the socket, and a portion 18i of the spigot is in contact with the portion 20c of the socket. The portions 18g, 18h and 18i are allowed to return towards their original dimensions, the portion 18g being allowed to return by a greater amount than the portions 18h and 18i since the mean wall thickness T/z of the portion 20e of the socket is less than that of the portions 20d and 20c and the length $L_z$ is greater.

In the resulting interference fit joint, the resistance to separation of the joint is increased, and the total axial load required to make the joint is reduced. A lubricant may also be used as previously described in connection with the embodiments shown in FIGS. 1 to 3.

We claim:

1. Apparatus comprising:
 (a) first tubular member having an end portion forming a spigot with an external mating surface with a preformed diameter; and
 (b) a second tubular member having an end portion forming a socket which defines a socket mouth; the socket having an internal mating surface with a preformed diameter less than the preformed diameter of the external mating surface of the spigot throughout the axial length of the mating surface thereof;
 (c) the spigot being in interference fit with the socket along the mating surfaces to join together the first and second tubular members along the longitudinal axis of said tubular members and
 (d) the end portion of at least one of the tubular members having a preformed wall thickness that varies in the axial direction, with the mating surface thereof before it is in interference fit with the other member being substantially cylindrical, such that the diameter of the external mating surface of the spigot and the mating diameter of the internal mating surface of the socket, when in interference fit with each other, are smaller at a first location on the axis that at a second location on the axis, the first location being nearer the mouth of the socket than the second location.

2. Apparatus as claimed in claim 1 wherein:
 (a) the socket includes first and second sections,
 (b) the mean wall thickness of the first section of the socket is greater than the mean wall thickness of the second section of the socket, and
 (c) the second section of the socket is further from the mouth of the socket than the first section of the socket.

3. Apparatus as claimed in claim 2, wherein the socket defines a plurality of axially spaced annular grooves in its radially outermost surface with the mean wall thickness of the socket at each groove being less than at the adjacent groove closer to the mouth of the socket.

4. Apparatus as claimed in claim 3 wherein the grooves are of different axial lengths.

5. Apparatus as claimed in claim 3 wherein the grooves are separated from each other by different distances.

6. Apparatus as claimed in claim 3 wherein the socket wall thickness radially inside each groove differs from one groove to another.

7. Apparatus as claimed in claim 2 wherein the thickness of the wall of the socket continuously decreases in an axial direction away from the mouth of the socket.

8. Apparatus as claimed in claim 7 wherein the external surface of the socket intersects a plane containing the axis of the socket in a straight line.

9. Apparatus as claimed in claim 7 wherein the external surface of the socket intersects a plane containing the axis of the socket in a curve, the center of curvature of which is spaced from the external surface of the socket.

10. Apparatus as claimed in claim 2 wherein the second section of the socket defines an annular groove in the socket's radially outermost surface.

11. Apparatus as claimed in claim 1 wherein:
 (a) the second tubular member is in the form of a sleeve,
 (b) a second end portion of the second tubular member forms a second socket, and
 (c) further including a third tubular member forming a second spigot received within the second socket.

12. Apparatus as claimed in claim 11 wherein:
 (a) the second socket defines a second socket mouth,
 (b) the second spigot is in interference fit with the second socket, and
 (c) the end portion of at least one of the second socket and second spigot has a preformed wall thickness that varies in the axial direction, with a mating surface thereof before it is in interference fit with the other being substantially cylindrical, such that the external diameter of the second spigot and the mating internal diameter of the second socket, when in interference fit with each other, are smaller at a third location on the axis than at a fourth location on the axis, the third location being nearer to the mouth of the second socket than the fourth location.

13. Apparatus as claimed in claim 1 wherein the maximum thickness of the wall of the socket is substantially equal to the maximum thickness of the wall of the spigot.

14. Apparatus as claimed in claim 1 wherein the wall thickness of the socket does not decrease by substantially more than one half of its maximum thickness.

15. Apparatus as claimed in claim 1 wherein the length of penetration of the spigot into the socket lies within the range of from one half to two and one half times the external diameter of the tubular member having the spigot.

16. Apparatus as claimed in claim 1 wherein the tubular members are composed of steel.

17. Apparatus as claimed in claim 1 wherein the end wall of the mouth of the socket is chamfered to facilitate initial insertion of the spigot.

18. Apparatus as claimed in claim 1 wherein the internal surface of the socket is grooved.

19. Apparatus as claimed in claim 1 wherein the diameter of the tubular members is within the range from ¼" to 48".

* * * * *